United States Patent [19]
Berg

[11] 4,237,366
[45] Dec. 2, 1980

[54] HEATED AUTOMOBILE MIRROR
[75] Inventor: Peter G. Berg, Attleboro Falls, Mass.
[73] Assignee: Texas Instruments Incorporated, Dallas, Tex.
[21] Appl. No.: 21,379
[22] Filed: Mar. 19, 1979
[51] Int. Cl.³ .............................................. H05B 1/00
[52] U.S. Cl. .................................. 219/219; 219/202; 219/505
[58] Field of Search ................ 219/219, 202, 505, 522

[56] References Cited
U.S. PATENT DOCUMENTS

| 2,564,836 | 8/1951 | Elsenheimer | 219/219 |
|---|---|---|---|
| 2,565,256 | 8/1951 | Myers et al. | 219/219 |
| 3,052,787 | 9/1962 | Williams | 219/219 |
| 3,996,447 | 12/1976 | Bouffard et al. | 219/505 |

Primary Examiner—C. L. Albritton
Attorney, Agent, or Firm—James P. McAndrews; John A. Haug; Melvin Sharp

[57] ABSTRACT

A mirror unit suitable for exterior mounting on an automobile includes a glass member with a reflecting surface, a thermally-conducting metal plate, a self-regulating electrical resistance heater body of material of positive temperature coefficient of resistivity having one side mounted on one side of the plate in thermally and electrically conducting relation to the plate, terminal means electrically connected to the opposite side of the heater body, and means securing the plate to the glass member for enclosing the heater body therebetween to heat the glass member for defogging the reflecting surface thereof.

10 Claims, 5 Drawing Figures

HEATED AUTOMOBILE MIRROR

BACKGROUND OF THE INVENTION

It has been proposed that a mirror intended for exterior use on an automobile be provided with an electrical resistance heater for defrosting or defogging the mirror when weather conditions require. Typically, however, such mirror arrangements have been expensive, have been bulky, or have been unreliable in use. It would be desirable if a heated mirror unit could be provided which would properly combine features of compactness, economy and reliability.

It is an object of this invention to provide a novel and improved heated mirror unit; to provide such a mirror unit which is compact and reliable in use; to provide such a mirror unit which is of simple and inexpensive construction; and to provide such a mirror unit which is of versatile construction adapted for various types of automotive applications and the like.

SUMMARY OF THE INVENTION

Briefly described, the novel and improved heated mirror unit of this invention comprises a conventional glass member or the like having a reflecting surface. The unit further includes a heat distributing plate, a heater body of ceramic electrical resistance material or the like of positive temperature coefficient of resistivity having one side of the body secured in electrically and thermally conductive relation to one side of the heat-distributing plate, and terminal means electrically connected to the opposite side of the heater body. In that arrangement, electrical current is adapted to be directed through the resistance heater body between the terminal means and the plate for heating the plate. If desired additional terminal means are connected to the plate for facilitating connection of the heater body in a circuit. Means are provided for mounting the heat-distributing plate in heat-transfer relation to the reflecting glass member and for securely locating the heater body enclosed between the member and plate for defogging the reflecting surface of the glass member.

In a preferred embodiment of the invention, the heat distributing plate is made of an easily formable, aluminum material having high thermal and electrical conductivity. A first recess or well is formed in one side of the plate and a disc-shaped heater body or element of ceramic resistance material of positive temperature coefficient of resistivity (PTC) is positioned in the well and is secured to the plate at the bottom of the well by means of a thermally and electrically conductive adhesive or solder or the like so that the heater element is electrically connected to the plate in excellent heat-transfer relation to the plate. A second recess or well is formed in the same side of the plate in communication with the first recess and an opening is provided in the bottom of the second recess. A spring terminal is secured in the second recess in electrically insulated relation to the plate. One end of the terminal extends into the first recess to electrically engage the opposite side of the heater body and the other end of the terminal extends from the opening in the second recess to be accessible from the opposite side of the plate. A glass mirror having a reflecting surface is secured over said one side of the heat-distributing plate to be in heat-transfer relation to the plate and to enclose the heater element and the spring terminal within the noted plate recesses.

In that arrangement, the heater element is easily connected in an electrical circuit in an automobile in any conventional way by connecting the plate and terminal in series between a power source and electrical ground. The heater self-heats when electrically energized and not only transfers heat efficiently for defogging the reflecting mirror but also self-heats to increase the resistivity of the heater so that it self-regulates and stabilizes at a safe temperature appropriate for the defogging purposes. The heater element and the spring terminal are compactly and securely enclosed between the heat-distributing plate and the glass mirror member so that the heated mirror unit is compact and reliable in use. The unit structure is also versatile in that the noted plate recesses and the like are easily and economically formed in any desired size of plate, thereby to accommodate a heater element and terminal means for any desired size of mirror unit.

DESCRIPTION OF THE DRAWINGS

Other objects, advantages and details of the novel and improved heated mirror unit of this invention appear in the following detailed description of preferred embodiments of the invention, the detailed description referring to the drawings in which.

DESCRIPTION OF THE PREFERRED EMBODIMENT

Figure 1:
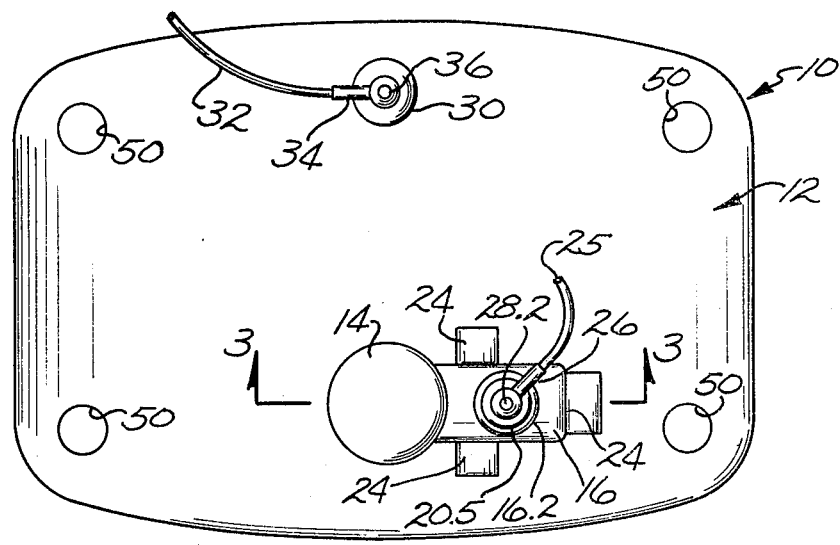
FIG. 1 is rear plan view of the heated mirror unit of this invention.
Figure 2:
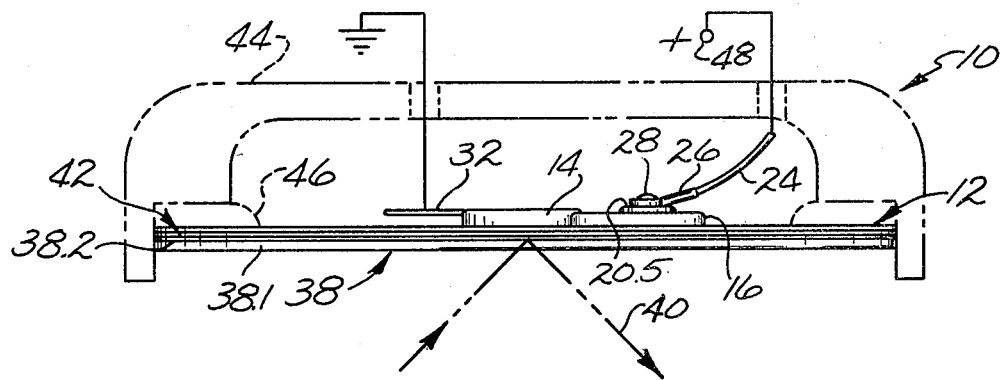
FIG. 2 is a side elevation view of the mirror unit of FIG. 1.
Figure 3:
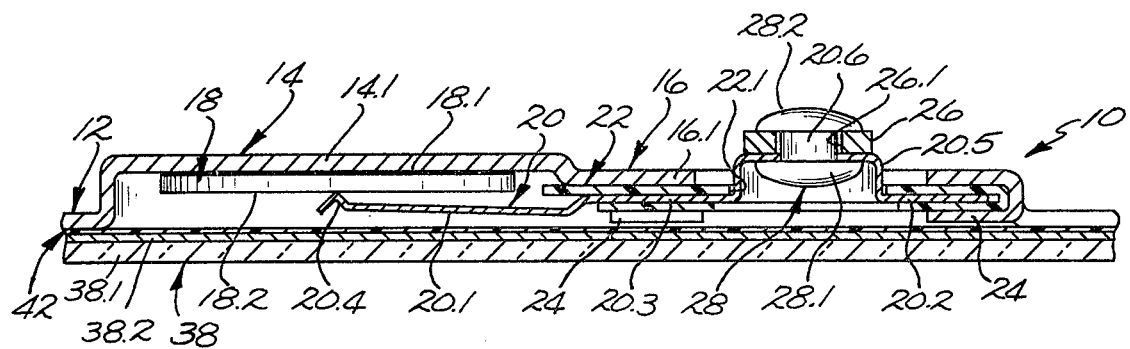
FIG. 3 is a partial section view to enlarged scale along line 3—3 of FIG. 1.

Referring to the drawing, 10 in FIGS. 1-3 indicates the novel and improved heated mirror unit of this invention which is shown to include an electrically and thermally conducting heat-distributing plate 12. The plate is preferably formed of an inexpensive, light weight and readily formable material such as aluminum or copper or the like which is also characterized by high electrical and thermal conductivity. Preferably the plate is of generally flat, thin configuration as shown in the drawings and, in accordance with this invention, a first recess or well 14 is formed in one side 12.1 of the plate by a conventional, drawing-type of forming operation. A second recess or well 16 is preferably formed in the same side of the plate adjacent to the first recess so that the second recess is in communication with the first recess as shown in FIGS. 1 and 3. The bottom 16.1 of the second recess has an opening 16.2 therein as shown in the drawings.

In accordance with this invention, a heater body or element 18 of ceramic electrical resistance material or the like of positive temperature coefficient or resistivity (PTC) is disposed in the first recess 14 with one side 18.1 of the element in electrically and thermally conducting engagement with the plate. Preferably, for example, the heater element 18 comprises a disc-like body of a lanthanum-doped barium titanate ceramic material of positive temperature coefficient of resistivity which is adapted to display a sharp, anomolous increase in resistivity when heated to a selected temperature. Preferably for example, the heater element 18 has a resistance of about 1–4 ohms at a temperature of about 75° F. but is adapted to display a sharply increased resistance of about 25–30 ohms when heated to a temperature of about 100° F., thereby to self-regulate or stabilize at that temperature in response to self-heating of the element. The heater disc 18 has metal coatings (not shown) on the opposite sides 18.1 and 18.2 of the disc which make ohmic contact to the ceramic resistance material of the element in a conventional manner. The coated side 18.1 of the disc is preferably secured to the bottom 14.1 of the first plate recess in any conventional manner by the use of silver-powder-filled epoxy or other electrically and thermally conductive adhesive or the like or by the use of soldering or the like so that the heater element is in excellent heat-transfer relation to the plate, is electrically connected to the plate, and is securely accommodated in the plate recess.

In accordance with this invention, a spring terminal 20 formed of a resilient, electrically conductive spring material such as beryllium copper of the like is disposed in the second well 16 in electrically insulated relation to the heat-distributing plate 12. The terminal is arranged so that one end 20.1 electrically engages the second side 18.2 of the heater element and so that the opposite end 20.2 of the terminal extends into the opening 16.2 in the second recess 16 to be accessible from the opposite side 12.2 of the plate 12. In that arrangement, the terminal 20 and plate 12 are adapted to be conveniently connected in series between a power source and electrical ground for energizing the electrical resistance heater element 18 as will be understood.

In a preferred embodiment of the invention, the terminal 20 has a wedge-shaped tip 20.3 at the first end thereof, has a central part 20.4 of generally flat configuration, and has a boss 20.5 formed in a manner similar to the wells 14 and 16 to stand up from the opposite end 20.2 of the terminal. A sheet 22 of polyethylene or other pliable electrically insulating material or the like is provided with an opening 22.1 to fit over the terminal boss 20.5 and is otherwise wrapped around the spring terminal 20 as is shown particularly in FIG. 3. Tabs 24 of the plate are knocked-down from the plate and are folded around the insulation-wrapped terminal as shown in the drawings, thereby to securely mount the terminal 20 on the plate 20 in electrically insulated relation to the plate so that the wedge-shaped tip 20.4 of the terminal is held in resilient electrical engagement with the second side 18.2 of the heater element and so that the terminal boss 20.5 extends into the recess opening 16.2 to be accessible from the opposite side 12.2 of the heat-distributing plate.

In a preferred embodiment of the heated mirror unit 10, an opening 20.6 is provided in the boss 20.5 on the spring terminal. A wire lead 25 having a clinched terminal 26 thereon and having an opening 26.1 in the clinch terminal is disposed so that the openings 20.6 and 26.1 are aligned. A rivet 28 is fitted through the openings while the rivet heat 28.1 is accommodated in the plate recess 16 and the opposite end 28.2 of the rivet is then headed over for securing the wire lead in electrical engagement with the spring terminal 20. If desired a similar recess or boss 30 having an opening therein (not shown) is formed elsewhere on the plate 12 in a manner similar to the recesses 14 and 16. A similar lead 32 having a clinched terminal 34 thereon and having an opening (not shown) in the clinch terminal is disposed so that the opening in the clinch terminal 34 is aligned with the opening in the boss 30. A rivet 36 then secures the lead 32 to the boss 30 in similar manner while the head of the rivet 36 (not shown) is accommodated in the boss 30 as will be understood. In that arrangement, the leads 32 and 34 permit convenient and reliable connection of the heater element 18 in an electrical circuit.

In accordance with this invention, the heated mirror unit 10 further includes a reflecting mirror member 38 having a reflecting surface thereon. Preferably for example, the mirror member comprises a glass sheet 38.1 having a reflecting metal coating 38.2 on one side of the sheet so that light directed toward the member is adapted to be reflected in conventional manner as is diagrammatically indicated in FIGS. 2 and 4 by the light rays 40.

In the mirror unit of this invention, the reflecting member 38 is secured in heat-transfer relation to the heat distributing plate 12 over the recesses 14 and 16 in the plate so that the heating element 18 and the spring terminal 20 are securely and safely accommodated and enclosed between the mirror member and the plate. In one preferred embodiment of the invention for example, a thin adhesive layer 42 is provided on the mirror member 38 over the reflecting coating 38.2 and is adhered to the plate 12 for securing the mirror member in close heat-transfer relation to the plate 12 to form the mirror unit 10. In that arrangement, the mirror unit 10 is adapted to be easily and economically mounted in a pivotable housing 44 or other support or the like by means of a cement 46 or in other conventional manner. The mirror unit is compact and is of an inexpensive structure. The unit is also adapted to be conveniently connected to a electrical power source 48 and to ground as is diagrammatically indicated in FIG. 2 for electrically energizing the heater element 18 in the mirror unit. In that way, the heater is adapted to rapidly generate heat when initially energized and to distribute that heat through the plate 12 to all parts of the reflecting member 38 for defrosting or defogging that member when weather conditions require. The heater element is further adapted to heat up after initial energization to reduce power consumption by the heater and to stabilize or self-regulate the heater temperature at a safe temperature suitable for maintaining the reflecting member in defogged condition. If desired, the heater 18 is adapted to be energized on an automobile whenever the automobile is operated as by closing of the ignition switch. Alternately, a separate manually operable switch (not shown) is provided for selectively energizing the heater 18 when desired.

Figure 4:
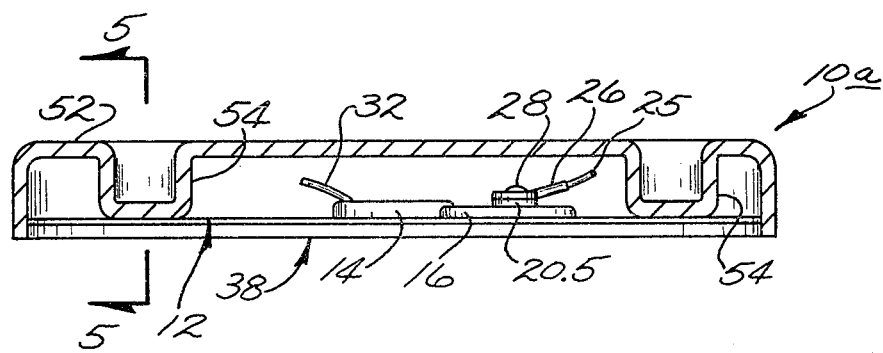
FIG. 4 is a side elevation view similar to FIG. 2 illustrating an alternate embodiment of the unit of this invention.
Figure 5:
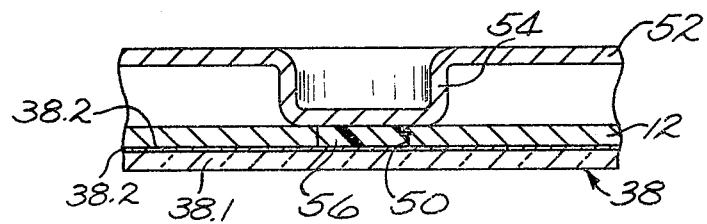
FIG. 5 is a partial section view to enlarged scale along line 5—5 of FIG. 4.

In another alternate embodiment of this invention, the heat-distributing plate 12 is provided with several holes as indicated at 50 in FIGS. 1 and 5. A pivotable housing or other support or the like diagrammatically indicated at 52 in FIGS. 4 and 5 is then provided with a plurality of bosses 54. The housing 52 is arranged to bear against the heat-distributing plate 12 while cement 56 deposited in the plate openings 50 holds the reflecting member 38 against the plate 12, thereby to secure the plate and reflecting member together in close heat-transfer relation to each other and to enclose the heater element 18 and spring terminal 20 between the plate and reflecting member. In that arrangement, the heater element is also adapted to be energized when required for defogging the reflecting member 38 as will be understood.

It should be understood that although particular embodiments of the heated mirror unit of this invention have been described in detail by way of illustrating this invention, the invention includes all modifications and equivalents of the described embodiments falling within the scope of the appended claims.

I claim:

1. A defogging mirror unit comprising a thermally conducting heat-distributing plate material formed to provide a recess in part of the plate material to be accessible from one side of the plate material, an electrical resistance heater of a material of positive temperature coefficient of resistivity having one side thereof mounted on said one side of the plate material within the recess in thermally and electrically conducting relation to the plate material, means electrically connected to the opposite side of the resistance heater for connecting the heater in an electrical circuit to energize the heater, a reflecting member having a reflecting surface, and means securing the reflecting member in heat transfer relation to said one side of the plate material extending over the recess for enclosing the heater therebetween in heat-transfer relation to the plate material for heating the plate material to distribute heat from the heater to the reflecting member for defogging the reflecting surface thereof.

2. A defogging mirror unit comprising a reflecting member with a reflecting surface, a thermally and electrically conducting metal plate material of a selected thickness formed to provide a recess in part of the plate material to be accessible from one side of the plate material, a self-regulating electrical resistance heater body of a material of positive temperature coefficient of resistivity having one side thereof mounted on said one side of the plate material within the recess in thermally and electrically conducting relation to the plate, terminal means electrically connected to an opposite side of the heater body, and means securing the reflecting member in heat transfer relation to said one side of the plate material extending over the recess for enclosing the heater body therebetween to heat the plate material and to transfer heat from the plate to the reflecting member for defogging the reflecting surface thereof.

3. A defogging unit comprising a reflecting member having a reflecting surface, a thermally and electrically conductive heat-distributing plate material of a selected thickness formed to provide recess means in one side thereof to be accessible from said one side of the plate material, a heater body of electrical resistance material of a positive temperature coefficient of resistivity which is adapted to display a sharp, anomolous increase in resistivity when self-heated to a selected temperature for stabilizing at said temperature, said heater body being disposed in said recess means with one side thereof secured in thermally and electrically conducting relation to said one side of the plate material, terminal means disposed in the recess means and engaged with the other side of the heater body for connecting the heater body in an electrical circuit, and means securing the reflecting member to said one side of the heat-distributing plate to extend over said recess means for enclosing the heater body and terminal means in the recess means spaced from the reflecting member and for heating the plate material to distribute heat to the reflecting member to defog the reflecting surface thereof.

4. A defogging mirror unit as set forth in claim 3 wherein the plate has an opening therein at said recess means and wherein said terminal means comprises a spring member having one portion resiliently engaged with said other side of the heater body and having another portion extending from the plate opening to be accessible from the opposite side of the plate.

5. A defogging mirror unit as set forth in claim 4 wherein the heater body comprises a lanthanum-doped barium titanate ceramic material which is adapted to display a sharp anomolous increase in resistivity when heated to a temperature of about 100° F.

6. A defogging mirror as set forth in claim 3 having adhesive means securing the plate in heat transfer relation to the reflecting member.

7. A defogging mirror unit comprising a reflecting member having a reflecting surface thereon, a thermally and electrically conducting heat-distributing metal plate material of a selected thickness having a portion thereof formed to provide recess means in one side of the plate material to be accessible from said one side, said recess means having an opening therein, a self-regulating electrical resistance heater having a body of electrical resistance material of positive temperature coefficient of resistivity which is adapted to display a sharp anomolous increase in resistivity when heated to a selected temperature, said heater being disposed within said recess means with one side of said body secured in electrically and thermally conducting relation to said one side of the plate material, a spring terminal member disposed in said recess means, said terminal member having one end portion resiliently engaged with said heater body at an opposite side thereof and having a second end portion extending into said recess opening to be accessible from the other side of said heat-distributing plate, electrical insulating means mounting said spring terminal in electrically insulated relation to the plate, and means securing the reflecting member in heat-transfer relation to said one side of the plate material over said recess means for enclosing the heater and spring terminal member in the recess means to heat the plate material to distribute heat to the reflecting member for defogging the reflecting surface thereof.

8. A defogging mirror unit comprising a reflecting member having a reflecting surface thereon, a thermally and electrically conducting heat-distributing metal plate have recess means formed in one side of the plate, said recess means having an opening therein, a self-regulating electrical resistance heater having a body of electrical resistance material of positive temperature coefficient of resistivity which is adapted to display a sharp anomolous increase in resistivity when heated to a selected temperature, said heater being disposed within said recess means with one side of said body secured in electrically and thermally conducting relation to said plate, a spring terminal member disposed in said recess means, said terminal member having one end portion resiliently engaged with said heater body at an opposite side thereof and having a second end portion extending into said recess opening to be accessible from the other side of said heat-distributing plate, electrical insulating means mounting said spring terminal in electrically insulated relation to the plate, and means securing the plate in heat transfer relation to the reflecting member over said recess means for enclosing the heater and spring terminal member in the recess means to heat the reflecting member for defogging the reflecting surface thereof, said plate having tabs struck down from said plate into said recess means for holding said electrical insulating means to mount the spring terminal in said recess means.

9. A defogging mirror as set forth in claim 7 wherein said second end portion of the spring terminal has a recessed boss formed therein and has an opening in said recessed boss, a first lead is provided with a clinch terminal thereon having an opening therein, and rivet means are partically accommodated in said recessed boss for securing the clinch terminal to said boss for facilitating electrical connection of the spring terminal in an electrical circuit.

10. A defogging mirror as set forth in claim 9 wherein said plate has a recessed boss formed thereon and has an opening in said recessed plate boss, a second lead is provided with a clinch terminal thereon having an opening therein, and rivet means are partially accommodated in said plate boss for securing the clinch terminal of the second lead to the plate boss for facilitating electrical connection of the plate in an electrical circuit.

* * * * *